(No Model.) 2 Sheets—Sheet 1.

J. M. O'NEALL.
ICE CREAM FREEZER.

No. 445,072. Patented Jan. 20, 1891.

WITNESSES:
Fred G. Dieterich
Jos. A. Ryan

INVENTOR
James M. O'Neall.
BY Munn & Co
ATTORNEY

THE NORRIS PETERS CO., PHOTO-LITHO., WASHINGTON, D. C.

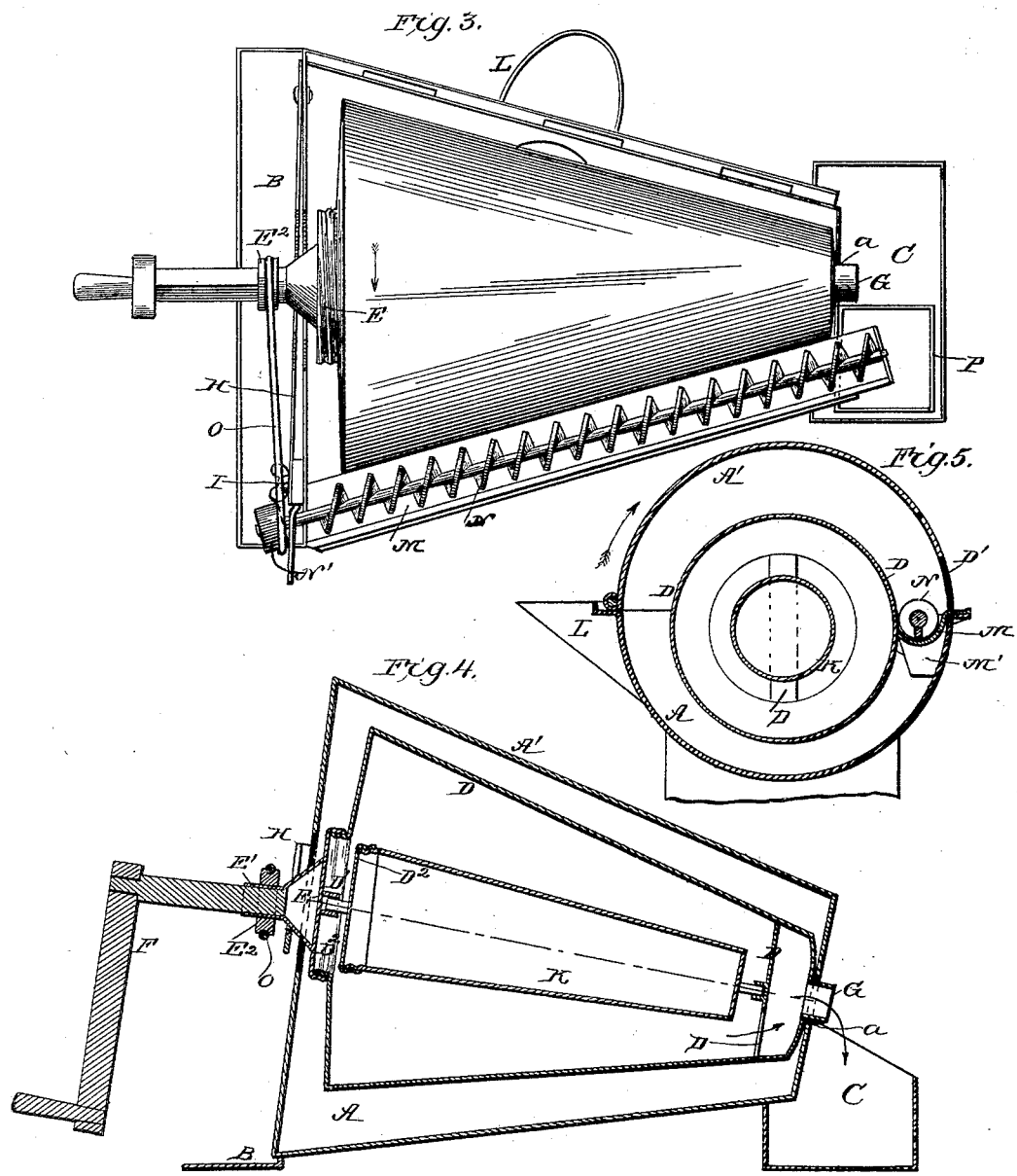

UNITED STATES PATENT OFFICE.

JAMES M. O'NEALL, OF DALLAS, TEXAS.

ICE-CREAM FREEZER.

SPECIFICATION forming part of Letters Patent No. 445,072, dated January 20, 1891.

Application filed May 4, 1889. Serial No. 309,662. (No model.)

*To all whom it may concern:*

Be it known that I, JAMES M. O'NEALL, of Dallas, in the county of Dallas and State of Texas, have invented a new and useful Improvement in Ice-Cream Freezers, of which the following is a specification.

My invention is an improvement in that class of ice-cream freezers in which the cream is taken up and frozen by contact with a revolving cylinder containing some refrigerant, and is removed therefrom by means of a suitable scraper.

The novel features of construction and combination of parts are as hereinafter specified.

Figure 1:
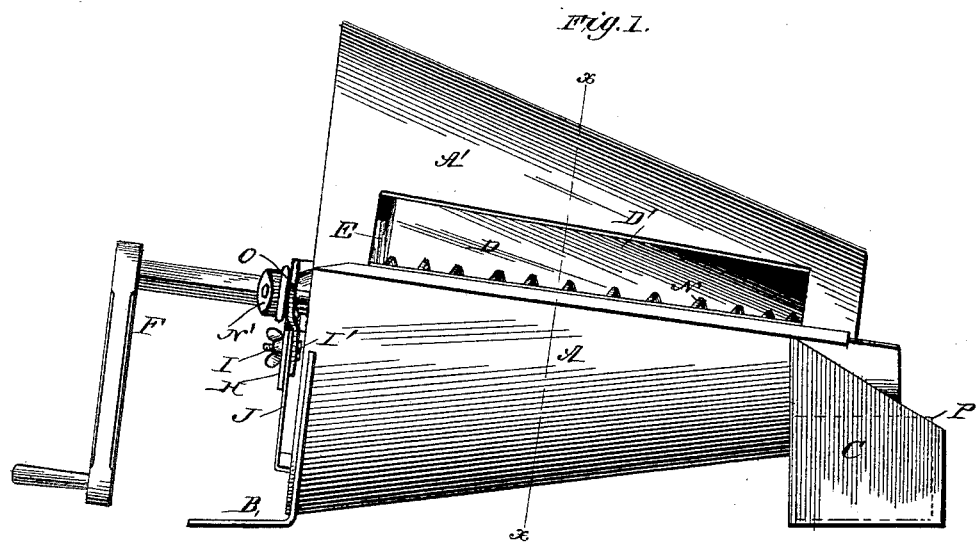
Figure 2:
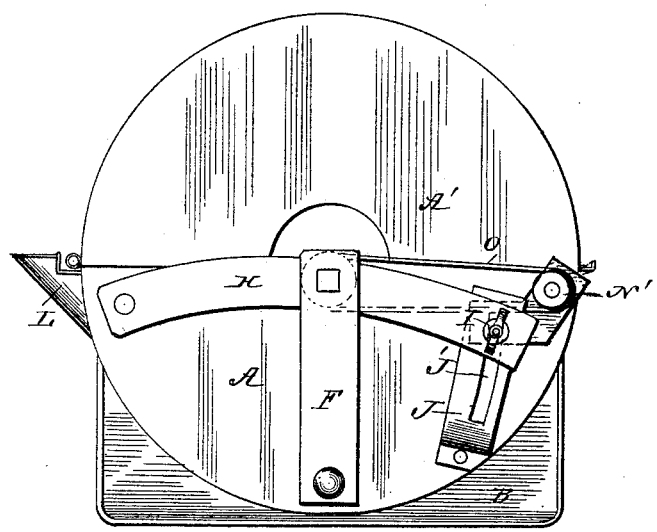

Referring to the accompanying drawings, Figure 1 is a side view of my new and improved ice-cream freezer. Fig. 2 is an end view of the same. Fig. 3 is a top plan view with the hinged top of the outer casing removed. Fig. 4 is a longitudinal vertical central sectional view of the invention. Fig. 5 is a vertical transverse sectional view taken on line $x\ x$ of Fig. 1, and Fig. 6 is a detail view of the trough-scraper.

The same letters of reference indicate corresponding parts in all the figures.

Referring to the several parts by letter, A A' indicate the outer casing of my new and improved ice-cream freezer, this casing being in the form of a truncated cone, and the upper part A' of the casing being hinged at one side to the lower half, as shown. The larger end of the casing is supported on a foot-piece B, while the smaller end is supported on one side of a box or chamber C.

I construct my ice-receptacle D in the form of a cone corresponding to the general shape of the outer casing. This conical receptacle has a central large opening D' in its upper larger end surrounded by a threaded flange $D^2$, on which a flat cap E screws, this cap having on its outer side a short axle E', the end of which is hollow for the reception of the end of a removable crank-handle F, by which the ice-receptacle is revolved. The lower end of the conical receptacle has a short hollow axle G, which rotates in a bearing $a$ in the outer casing. The upper axle E', to which the operating-handle is attached, is steadied by a brace H, through which it passes, this brace being pivoted at one end and having at the other end a thumb-screw I, which passes through a guide-slot J' in a raised plate J, the screw having a nut I' on its inner end, by which construction the brace H can be adjusted to adjust the conical receptacle D as may be desired.

Within the cone D is secured, as shown, a metal cylinder K, having a closed bottom and having its upper end closed, preferably, by a screw-cap. This cylinder serves a double purpose. First, it serves to hold the ice and salt or other refrigerant out against the sides of the cone D, keeping the surface of the cone thoroughly chilled. The refrigerant is placed in the cone through the top opening D' and fits between the outer surface of the inner cylinder and the sides of the cone, whereby a considerable economy is effected in the amount of refrigerant required, as it is not necessary to fill the entire inner space of the large ice-receptacle. The second function of the cylinder K is that it serves as an excellent cooler for water, milk, beer, &c.

At the side of the casing A to which the top A' is hinged the casing is provided with a feed-hopper L, which opens into the casing, as shown, while to the other flanged edge of the lower half A is attached a trough M, whose inner edge bears against the side of the cone D, and thus serves as a scraper to remove the film of frozen cream that adheres to the cone.

The refrigerant being placed in the cone D through the opening D', the cap E is screwed on and the cone placed in the casing. The freezer being filled through the hopper L, the cone D is revolved in the direction indicated by the arrow in Fig. 3. As the cone is thus revolved, the inner edge of the trough will scrape the frozen cream off the cone, when it will drop into the trough. In the trough is mounted a spiral screw conveyer N, the upper projecting end of the shaft of which has a pulley N' on it, and a belt O passes around this pulley and a pulley $E^2$ on the axle E. The screw conveyer is thus revolved as the cone D is turned and works the frozen cream down the trough, discharging it from the end thereof into a vessel, as P, placed in the box C. As the ice in the cone D gradually melts, the cold brine runs through the lower hollow axle G into the box C, preserving the frozen cream in the vessel P.

I am aware that an ice-cream freezer has been heretofore patented (No. 323,732, dated August 4, 1885) in which the ice-receptacle is a cylinder of equal diameter from end to end with parallel ends; but it will be seen that by making my ice-receptacle in the form of a cone it is better adapted to discharge its contents at the smaller end, and that the cone and combined trough and scraper can be easily removed to permit cleaning them and adjacent parts.

Having thus described my invention, what I claim, and desire to secure by Letters Patent, is—

1. In an ice-cream freezer, the conical revolving ice-receptacle having a hollow axle at its lower end and the flanged opening in its upper end, and the screw-cap therefor having an axle formed thereon, substantially as set forth.

2. In an ice-cream freezer, the conical revolving ice-receptacle having a cylinder secured within it and having a hollow axle at its lower end and the flanged opening in its upper end, and the screw-cap therefor having an axle formed thereon, substantially as set forth.

3. In an ice-cream freezer, the combination, with an outer casing and a revolving ice-receptacle, of a combined scraper and trough, and a spiral conveyer mounted therein and driven by connection with the revolving ice-receptacle, substantially as set forth.

4. The combination, with the conical outer casing and the conical revolving ice-receptacle having a pulley on its upper axle, of the combined scraper and trough, and the spiral conveyer having a pulley on the upper end of its shaft and a belt connecting said pulleys, substantially as set forth.

5. The combination of the conical outer casing having the hinged top and feed-hopper and the box at its lower end, the conical ice-receptacle having a hollow axle at one end and the flanged opening at the other, the screw-cap therefor having the hollow axle formed thereon and the pulley on the same, the combined scraper and trough, and the spiral conveyer mounted therein and having the pulley on its upper end and the belt, substantially as set forth.

6. The combination of the conical outer casing having the hinged top and feed-hopper and the box at its lower end, the conical ice-receptacle having the cylinder within it and having the hollow axle at one end and the flanged opening at the other, the screw-cap therefor having the hollow axle formed thereon and the pulley on the same, the combined scraper and trough, and the spiral conveyer mounted therein and having the pulley on its upper end and the belt, substantially as set forth.

7. The combination, with the outer casing and the revolving ice-receptacle, of the adjustable brace in which one end of the axle has its bearing, substantially as set forth.

JAMES M. O'NEALL.

Witnesses:
P. A. JORDAN,
J. M. REAGAN.